United States Patent

[11] 3,622,008

[72] Inventors: Nicholas A. Mucci, Pennsauken; John W. Rhine, Turnersville; Harry J. Wonderland, Lakehurst, all of N.J.
[21] Appl. No. 886,891
[22] Filed Dec. 22, 1969
[45] Patented Nov. 23, 1971
[73] Assignee Flexitallic Gasket Company Inc. Camden, N.J.

[54] COMPRESSION GASKET AND SCREEN ASSEMBLY
3 Claims, 3 Drawing Figs.
[52] U.S. Cl. .................................................. 210/445
[51] Int. Cl. .................................................. B01d 27/00
[50] Field of Search .................................. 210/445–447, 450, 453

[56] References Cited
UNITED STATES PATENTS

| | | | |
|---|---|---|---|
| 140,907 | 7/1873 | Evarts | 210/445 |
| 1,236,100 | 8/1917 | Nance | 210/445 X |
| 2,771,998 | 11/1956 | Holden | 210/446 |
| 2,772,002 | 11/1956 | Mauro | 210/445 |

Primary Examiner—Reuben Friedman
Assistant Examiner—R. W. Burks
Attorney—Nathaniel L. Leek ABSTRACT: The combination of a compressible gasket having a circumferential groove in its inner periphery with a screen fitting within the inner periphery of the gasket and having a rim disposed in the inner groove. The screen is gripped by the gasket hen the gasket is placed under compression.

PATENTED NOV 23 1971     3,622,008

INVENTORS
NICHOLAS A. MUCCI
JOHN W. RHINE
BY HARRY J. WONDERLAND

*N. L. Leek*
ATTORNEY

COMPRESSION GASKET AND SCREEN ASSEMBLY

This invention relates to compression gaskets of the spiral-wound type and screen for use in pipelines or the like.

An object is to provide novel and improved means for assembling and installing screens in pipelines.

Another object is to provide a construction wherein the screen is readily handled or removed with the gasket.

A further object is to provide an improved means for supporting a screen in a pipeline.

Various other objects and advantages will be apparent as the nature of the invention is more fully disclosed.

In one embodiment a pair of screens having different mesh sizes are assembled together and retained as a unit by a rim member. These screens are adapted to snap into the inner groove of a compressible gasket and to be retained and gripped by the gasket as the latter is expanded radially by transverse compression. The screen and gasket are thus handled as a unit for insertion into or removal from the pipeline.

The nature of the invention will be better understood from the following description, taken in connection with the accompanying drawing in which a specific embodiment has been set forth for purposes of illustration.

Figure 1:
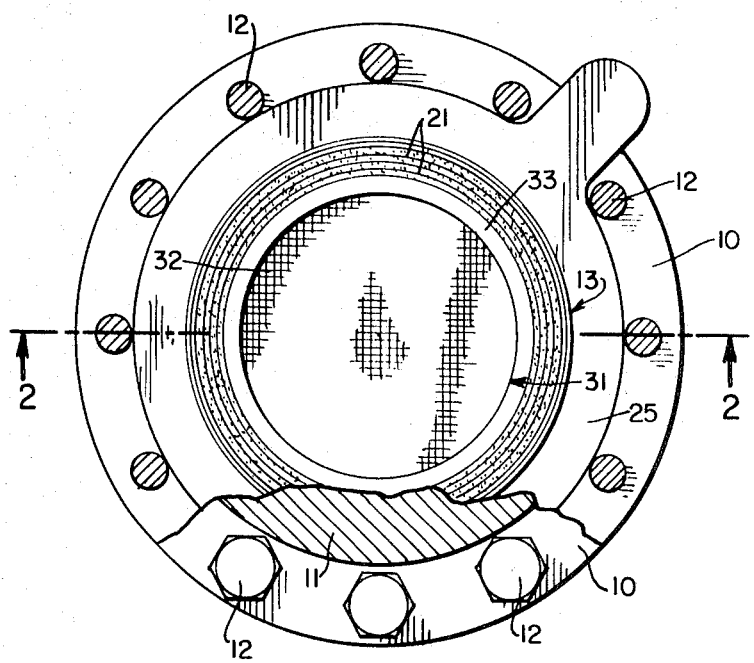
FIG. 1 is a broken plan view of a portion of a pipeline showing the gasket and screen in place.
Figure 2:
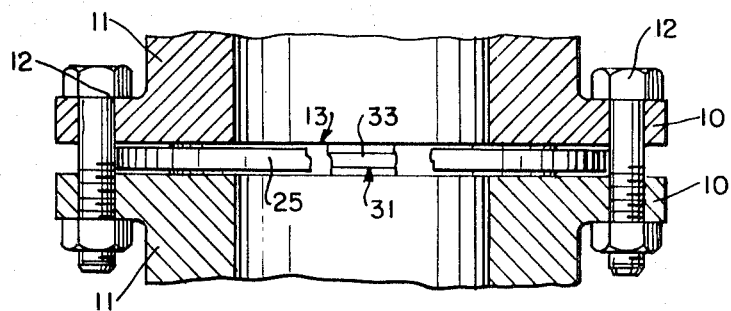
FIG. 2 is a section taken on the line 2—2 of FIG. 1.

Referring to the drawing more in detail the gasket and screen are shown as disposed between adjacent flanges 10 of pipe sections 11 which are secured together by a circle of bolts 12.

Figure 3:
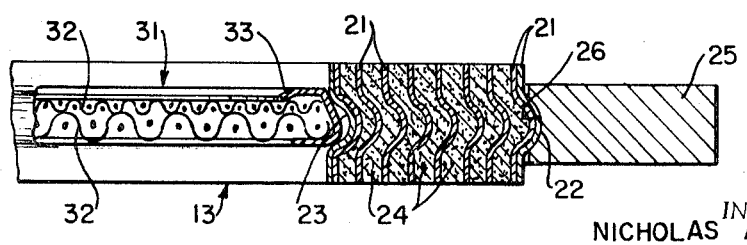
FIG. 3 is an enlarged view of a portion of the section shown in FIG. 2.

As shown in FIG. 3 the gasket 13 is of the spiral-wound type formed from a metal strip 21 having a central longitudinal bead 22 formed on one side and a corresponding groove 23 formed on the other side. The metal strip 21 is spirally wound with a strip 24 of a compressible material in alternate convolutions to form a flat, compressible gasket with the bead 22 exposed at its outer periphery and with the groove 23 exposed at its inner periphery. A centering ring 25 may be disposed around the outer periphery of the gasket to center the same within the circle of bolts 12. This ring 25 may have a groove 26 in its inner periphery into which the outer bead 22 of the gasket is seated and may have a thickness adapted to limit the compression of the gasket when the bolts are tightened.

A screen 31 is shown as composed of a pair of laminations 32 of screening having different mesh sizes which are held together by a peripheral rim 33. The rim 33 is of a size and shape to be snapped into and to seat within the inner groove 23 of the gasket.

Then the gasket and screen unit are disposed between the pipe flanges 10 and compressed the gasket expands radially to grip the screen firmly and to form a seal therewith so that the fluid flowing through the pipeline is confined to the screen openings. The screen and gasket is readily removed for cleaning when the bolts 12 are removed.

The gasket and screen combination is suitable for use in steam lines to remove particles or condensate and is generally useful for removing foreign particles from fluids in a pipeline.

What is claimed is:

1. A compressible gasket of the spiral-wound type composed of a metal strip having a central groove and a strip of compressible material wound in alternate convolutions with the groove disposed at the inner periphery of the gasket and a screen dimensioned to fit within the inner periphery of said gasket, said screen having a peripheral rim of a size to enter said inner peripheral groove for securing the screen in place in said gasket.

2. The invention set forth in claim 1 in which said screen comprises a plurality of laminations each of which have mesh openings of different size, said rim securing said laminations together.

3. The invention set forth in claim 1 including a centering ring disposed around the outer periphery of said gasket and adapted to form a stop to limit the compression of said gasket.

* * * * *